US011449291B2

(12) United States Patent
Kusumoto

(10) Patent No.: US 11,449,291 B2
(45) Date of Patent: Sep. 20, 2022

(54) INFORMATION PROCESSING APPARATUS GENERATING PARAMETERS CONCERNING SHEET CORRESPONDING TO TYPE OF PRINTER USING AN INTERFACE MODULE AND APPLICATION PROGRAMMING INTERFACE

(71) Applicant: BROTHER KOGYO KABUSHIKI KAISHA, Aichi (JP)

(72) Inventor: Naoki Kusumoto, Nagoya (JP)

(73) Assignee: BROTHER KOGYO KABUSHIKI KAISHA, Brother Kogyo (JP)

( * ) Notice: Subject to any disclaimer, the term of this patent is extended or adjusted under 35 U.S.C. 154(b) by 71 days.

(21) Appl. No.: 16/655,327

(22) Filed: Oct. 17, 2019

(65) Prior Publication Data
US 2020/0272386 A1     Aug. 27, 2020

(30) Foreign Application Priority Data
Feb. 27, 2019  (JP) .............................. JP2019-033576

(51) Int. Cl.
G06F 3/12     (2006.01)

(52) U.S. Cl.
CPC .......... *G06F 3/1255* (2013.01); *G06F 3/1208* (2013.01); *G06F 3/1231* (2013.01); *G06F 3/1258* (2013.01)

(58) Field of Classification Search
None
See application file for complete search history.

(56) References Cited

U.S. PATENT DOCUMENTS 8,199,144 B2 * 6/2012 Sakura ................. G06F 3/1205
                                                          358/1.9
9,565,053 B2 * 2/2017 Kadota ................. G06F 21/608
(Continued)

FOREIGN PATENT DOCUMENTS

JP     2008-269265 A    11/2008

OTHER PUBLICATIONS

Office Action dated Oct. 28, 2020 received in U.S. Appl. No. 16/655,355.
(Continued)

*Primary Examiner* — Mohammad H Ghayour
*Assistant Examiner* — Pawan Dhingra
(74) *Attorney, Agent, or Firm* — Scully Scott Murphy and Presser

(57) ABSTRACT

A non-transitory computer readable storage medium storing a set of program instructions for an information processing apparatus. The set of program instructions includes a set of first program instructions. The set of the first program instructions, when executed by a computer, causes the information processing apparatus to perform: in response to calling a first Application Programming Interface (API) from an interface module, transferring the first API to the interface module; receiving a specific value through the first API to which the interface module inputs the specific value as the argument; acquiring printer type information indicating a type of the printer; acquiring a printer characteristic value corresponding to the printer type information; generating second parameters by using the specific value and the printer characteristic value; and outputting the generated second parameters. The second parameters are all of parameters concerning the sheet and corresponding to the printer type information.

11 Claims, 4 Drawing Sheets

(56) References Cited

U.S. PATENT DOCUMENTS

| | | | |
|---|---|---|---|
| 10,089,560 B2* | 10/2018 | Nakamura | G06F 3/1229 |
| 10,459,668 B2* | 10/2019 | Nakamura | G06F 3/1254 |
| 2006/0221372 A1* | 10/2006 | Onishi | H04N 1/00938 |
| | | | 358/1.13 |
| 2006/0238786 A1* | 10/2006 | Sakura | G06F 3/1205 |
| | | | 358/1.9 |
| 2006/0238793 A1* | 10/2006 | Akashi | G06F 3/1204 |
| | | | 358/1.13 |
| 2008/0259398 A1* | 10/2008 | Osuka | B41J 15/042 |
| | | | 358/1.15 |
| 2009/0027725 A1* | 1/2009 | Okazawa | H04L 63/10 |
| | | | 358/1.15 |
| 2009/0168096 A1* | 7/2009 | Toda | G06F 3/1288 |
| | | | 358/1.15 |
| 2010/0149586 A1* | 6/2010 | Natori | G06F 9/544 |
| | | | 358/1.15 |
| 2010/0296122 A1* | 11/2010 | Mitsui | G06F 3/1204 |
| | | | 358/1.15 |
| 2011/0019222 A1* | 1/2011 | Tang | G06F 3/1207 |
| | | | 358/1.14 |
| 2013/0033714 A1* | 2/2013 | Nakagawa | G06F 3/1254 |
| | | | 358/1.9 |
| 2014/0049790 A1* | 2/2014 | Nakamura | G06F 3/1298 |
| | | | 358/1.13 |
| 2016/0077777 A1* | 3/2016 | Kobayashi | G06F 3/1254 |
| | | | 358/1.15 |

OTHER PUBLICATIONS

Official Action dated Sep. 9, 2020 from related U.S. Appl. No. 16/655,307.
Related U.S. Appl. No. 16/655,307, filed Oct. 17, 2019.
Related U.S. Appl. No. 16/655,355, filed Oct. 17, 2019.

* cited by examiner

FIG. 2 (A)
ptd FOLDER 54

- ptd FILE — 541
- ptd FILE — 541
- ⋮

FIG. 2 (B)
ptd FILE 541

| RESOLUTION | 300 × 300 |
|---|---|
| NUMBER OF PINS | 30 |
| ⋮ | ⋮ |

FIG. 2 (C)
TABLE 55

| MODEL NAME | FILE PATH |
|---|---|
| AAA-001 | aaabbbccc |
| AAA-002 | dddeeefff |
| ⋮ | ⋮ |

FIG. 2 (D)
DATABASE 56

| MODEL NAME | SHEET TYPE | SHEET WIDTH | | SHEET LENGTH | | MARGIN (WIDTH) | | ... |
|---|---|---|---|---|---|---|---|---|
| | | MAX. | MIN. | MAX. | MIN. | MAX. | MIN. | ... |
| AAA-001 | NON-FIXED LENGTH SHEET | a | b | — | — | g | h | ... |
| AAA-002 | STANDARD SIZE SHEET | c | d | e | f | i | j | ... |
| ⋮ | | | | ⋮ | | | | |

INFORMATION PROCESSING APPARATUS GENERATING PARAMETERS CONCERNING SHEET CORRESPONDING TO TYPE OF PRINTER USING AN INTERFACE MODULE AND APPLICATION PROGRAMMING INTERFACE

CROSS REFERENCE TO RELATED APPLICATION

This application claims priority from Japanese Patent Application No. 2019-033576 filed Feb. 27, 2019. The entire content of the priority application is incorporated herein by reference.

TECHNICAL FIELD

The present disclosure is related to a technique to transmit parameters required for printing to a printer.

BACKGROUND

There is known a printer that requires the inputting of several parameters to execute printing. For example, a label printer needs such inputs as a parameter indicating the size of a margin, and a parameter indicating the length of a label in order to perform printing. The printer performs printing in response to receiving these parameters.

There is also known an application that transmits to a printer parameter required to perform printing.

SUMMARY

However, there is no disclosure about configurations of the conventional application described above so as to facilitate development thereof.

It is an object of this disclosure to provide a technique to facilitate development of an application that transmits to a printer parameter required to perform printing.

In order to attain the above and other objects, the disclosure provides a non-transitory computer readable storage medium storing a set of program instructions for an information processing apparatus including a computer, a communication interface configured to communicate with a printer, and a user interface configured to receive a user input. The set of program instructions includes a set of first program instructions. The set of the first program instructions, when executed by the computer, causes the information processing apparatus to perform: in response to calling a first API from an interface module, transferring the first API to the interface module to enable the interface module to input a specific value as an argument into the received first API, the interface module acquiring a first parameter via the user interface, the first parameter concerning a sheet on which the printer prints an image on which an image is to be printed, the specific value depending on the first parameter; receiving the specific value through the first API to which the interface module inputs the specific value as the argument; acquiring printer type information indicating a type of the printer; acquiring a printer characteristic value corresponding to the printer type information; generating second parameters by using the specific value and the printer characteristic value, the second parameters being all of parameters which concern the sheet and correspond to the type of the printer indicated by the printer type information; and outputting the generated second parameters.

According to another aspect, the disclosure provides a non-transitory computer readable storage medium storing a set of program instructions for an information processing apparatus including a computer, and a communication interface configured to communicate with a printer. The set of program instructions includes a set of first program instructions and a set of second program instructions for controlling the computer to function as the interface module. The set of first program instructions, when executed by the computer, causes the information processing apparatus to perform: in response to calling a first API from an interface module, transferring the first API to the interface module to enable the interface module to input a specific value as an argument into the received first API, the interface module acquiring a first parameter via the user interface, the first parameter concerning a sheet on which the printer prints an image on which an image is to be printed, the specific value depending on the first parameter; receiving the specific value through the first API to which the interface module inputs the specific value as the argument; acquiring printer type information indicating a type of the printer; acquiring a printer characteristic value corresponding to the printer type information; generating second parameters by using the specific value and the printer characteristic value, the second parameters being all of parameters which concern the sheet and correspond to the type of the printer indicated by the printer type information; outputting the generated second parameters; in response to calling a second API from the interface module, transferring the second API to the interface module to enable the interface module to input a file including the second parameters as an argument into the second API; receiving the file including the second parameters through the second API to which the interface module inputs the file as the argument; and outputting the received second parameters included in the received file. The set of second program instructions includes: receiving a user selection from one of a first selection for inputting the setting file including the second parameter and a second selection for inputting the first parameter; in response to receiving the first selection, calling the first API; and in response to receiving the second selection, calling the second API.

According to still another aspect, the disclosure provides an information processing apparatus includes a communication interface configured to communicate with a printer; a user interface configured to receive a user input; and a computer. The computer is configured to perform: in response to calling a first API from an interface module, transferring the first API to the interface module to enable the interface module to input a specific value as an argument into the received first API, the interface module acquiring a first parameter via the user interface, the first parameter concerning a sheet on which the printer prints an image on which an image is to be printed, the specific value depending on the first parameter; receiving the specific value through the first API to which the interface module inputs the specific value as the argument; acquiring printer type information indicating a type of the printer; acquiring a printer characteristic value corresponding to the printer type information; generating second parameters by using the specific value and the printer characteristic value, the second parameters being all of parameters which concern the sheet and correspond to the type of the printer indicated by the printer type information; and outputting the generated second parameters.

According to still another aspect, the disclosure provides a method for controlling an information processing apparatus including: a communication interface configured to communicate with a printer; a user interface configured to receive a user input; and a computer. The method includes: in response to calling a first API from an interface module, transferring the first API to the interface module to enable the interface module to input a specific value as an argument into the received first API, the interface module acquiring a first parameter via the user interface, the first parameter concerning a sheet on which the printer prints an image on which an image is to be printed, the specific value depending on the first parameter; receiving the specific value through the first API to which the interface module inputs the specific value as the argument; acquiring printer type information indicating a type of the printer; acquiring a printer characteristic value corresponding to the printer type information; generating second parameters by using the specific value and the printer characteristic value, the second parameters being all of parameters which concern the sheet and correspond to the type of the printer indicated by the printer type information; and outputting the generated second parameters.

BRIEF DESCRIPTION OF THE DRAWINGS

The particular features and advantages of the disclosure as well as other objects will become apparent from the following description taken in connection with the accompanying drawings, in which:

FIG. 2(A) is a block diagram illustrating a ptd folder;

FIG. 2(B) is an explanatory diagram illustrating a ptd file;

FIG. 2(C) is an explanatory diagram illustrating a table;

FIG. 2(D) is an explanatory diagram illustrating a database;

DETAILED DESCRIPTION

Figure 1:
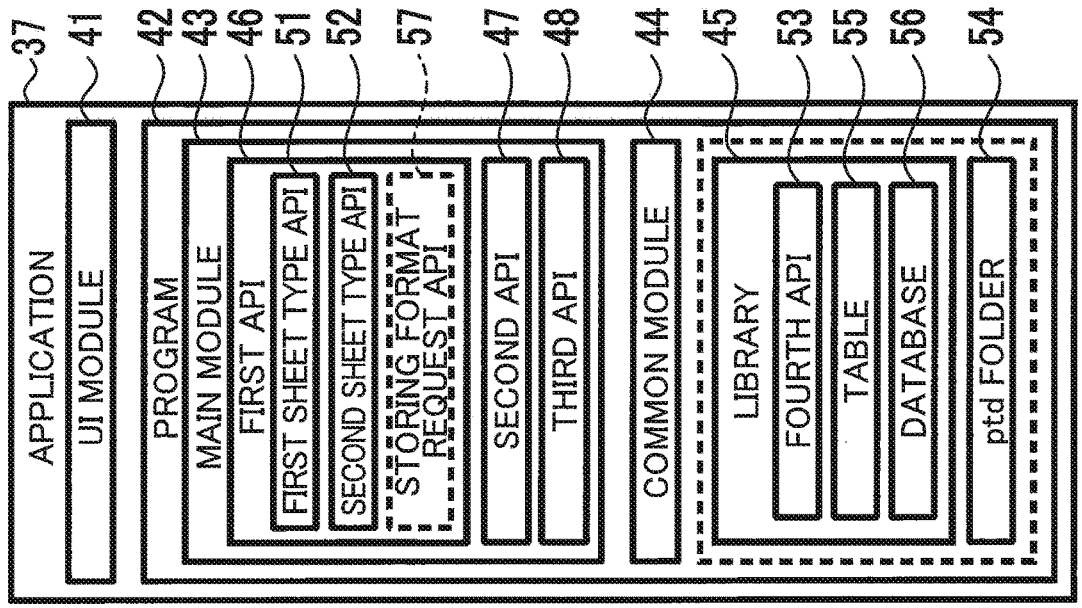
FIG. 1(A) is an explanatory diagram illustrating an information processing apparatus and a printer.
FIG. 1(B) is a block diagram illustrating the information processing apparatus.
FIG. 1(C) is a block diagram illustrating an application installed on the information processing apparatus.
Figure 1:
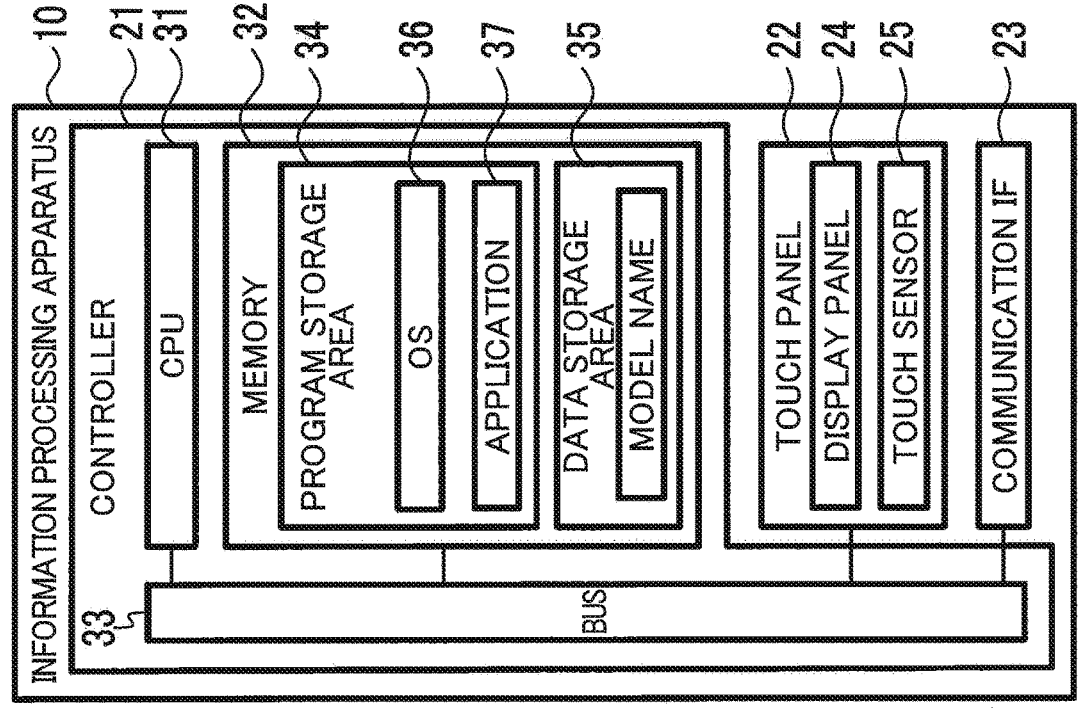
Figure 1:
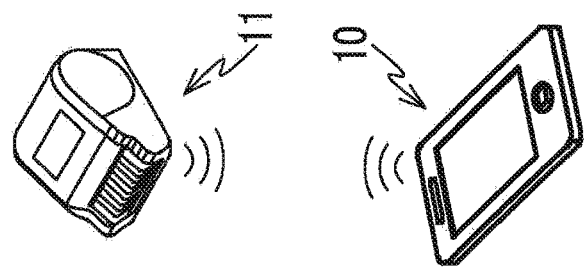

An embodiment of the present disclosure will be described while referring to the drawings. The following embodiment is an example, and it would be apparent to those skilled in the art that various changes and modifications may be made thereto. For example, the order of the processes or steps described below may be modified within the scope of the invention.

An information processing apparatus 10 shown in FIGS. 1(A)-1(C) will be explained. The information processing apparatus 10 is a mobile terminal, a tablet, or a personal computer, for example. In the following example, the information processing apparatus 10 is a mobile terminal.

The information processing apparatus 10 is provided with an application 37. The application 37 is a program that transmits print data to a printer 11, enabling the printer 11 to print the print data. In the embodiment, the printer 11 executes the print according to the application 37 implemented on the information processing apparatus 10 as described later.

The printer 11 is a label printer that prints images on labels. The printer 11 includes a controller (not shown) and a print engine (not shown). The print engine includes a conveyance mechanism configured to convey a sheet such as a label, and a print head configured to print an image on the conveyed sheet. The print head is a thermal head. The printer 11 need not be a label printer. The print engine may be any type that can print an image on a sheet.

The controller of the printer 11 includes a CPU (Central Processing Unit), a memory, and a communication interface. The configuration of the communication interface in the printer 11 is substantially the same as a communication interface 23 in the information processing apparatus 10 described later. The printer 11 can communicate with the information processing apparatus 10 via its communication interface.

The configuration of the memory in the printer 11 is substantially the same as a memory 32 in the information processing apparatus 11 described later. Normal sheet settings are pre-stored in the memory of the printer 11. The normal sheet settings indicate whether a sheet is a standard-size sheet or a non-fixed length sheet. For standard-size sheets, the normal sheet settings further indicate parameters (or setting values), such as the width and length of the sheet, the sizes of margins on the sheet with respect to a longitudinal direction, and the size of margins on the sheet with respect to a widthwise direction. The standard-size sheets are die-cut sheets.

The memory of the printer 11 stores a control program executed by the CPU. The control program executed by the CPU controls the print engine to print an image represented by print data inputted via the communication interface on the sheet.

The control program cannot process data in a text format, but can process data in a binary format. As described later, an application 37 in the information processing apparatus 10 generates print data and a command in the binary format, and transmits the print data and the command to the printer 11. The binary format is a data format that the printer can read.

The information processing apparatus 10 includes a controller 21, a touch panel 22, and a communication interface (IF) 23.

The communication IF 23 is an interface configured to transmit and receive data such as print data according to a standard for communication such as wireless communication. The information processing apparatus 10 is configured to communicate directly with the printer 11 via the communication IF 23, or to communicate indirectly with the printer 11 via one or more access points included in a communication line such as a Local Area Network (LAN). For example, the communication IF 23 is configured to communicate with the printer 11 according to a communication standard, such as Wi-Fi (registered trademark) or Bluetooth (registered trademark), or according to a communication standard for a near-field communication network, such as Near-Field Communication (NFC).

The touch panel 22 includes a display panel 24 and a touch sensor 25 laid over the display panel 24. The display panel 24 is configured to display characters and figures. The touch sensor 25 is a transparent film. The touch sensor 25 is configured to output position data indicating a position on the display panel 24 that the user touches. The position data is expressed by a coordinate (x, y) in an x-y plane, where the upper-left end of the display panel 24 is set as the origin, the rightward direction corresponds to the x-direction, and the downward direction corresponds to the y-direction. A User Interface (UI) module 41 described later determines that a user selected an object such as an icon when receiving position data of the object displayed on the display panel 24 from the touch sensor 25. The user inputs text or numerical values into the UI module 41 by touching objects.

The touch sensor 25 is an example of a user interface. The information processing apparatus 10 may include a microphone instead of or in addition to the touch sensor 25. The microphone is configured to convert the user's voice into sound data and input the sound data into the controller 21. The microphone is an example of the user interface.

The controller 21 includes a CPU (Central Processing Unit) 31, a memory 32, and a communication bus 33. The CPU 31 is an example of a computer.

The controller 21 is implemented by a patterned substrate and various electronic components mounted on the patterned substrate, such as a microcomputer, ICs, capacitors, and diodes.

The CPU 31 and the memory 32 are connected to the communication bus 33. The CPU 31 is configured to execute an operating system (OS) 36 and the application 37 stored in the memory 32 described later. The OS 36 or the application 37 executed by the CPU 31 reads data or information from the memory 32, and writes data or information to the memory 32.

The CPU 31 is configured to execute the OS 36, and the UI module 41, a main module 43, a common module 44, and a library 45 of the application 37 (described later) in parallel or pseudo-parallel. In other words, the OS 36, the UI module 41, the main module 43, the common module 44, and the library 45 are executed through multitasking.

The memory 32 is a Read Only Memory (ROM), a Random Access Memory (RAM), an Electrically Erasable Programmable Read Only Memory (EEPROM), an Hard Disk Drive (HDD), or a buffer provided in the CPU 31. The memory 32 includes a program storage area 34 storing the OS 36 and the application 37, and a data storage area 35 storing information and data.

The data storage area 35 stores a model name and an application name correlated with each other. The model name indicates the type of the printer 11. The application name indicates the name of the application 37. When the application 37 is installed on the information processing apparatus 10 and/or settings for the installed application 37 are made, the OS 36 registers the model name of the printer designated by the user via the touch panel 22 in the data storage area 35 in correlation with the application name. Alternatively, the model name of the printer 11 is registered as the application name when the application 37 is installed and set. The model name is an example of a printer type information.

The OS 36 is Android (registered trademark), iOS (registered trademark), Windows Phone (registered trademark), or BlackBerry OS (registered trademark).

The application 37 has a function to generate print data and to transmit the print data to the printer 11 via the communication IF 23. The application 37 further has a function to generate a customized setting and to transmit the generated customized setting together with the print data to the printer 11. Here, the customized setting is a sheet setting (a setting related to a sheet) different from the normal sheet settings pre-stored in the memory of the printer 11.

The application 37 includes the UI (User Interface) module 41, and a program 42. The UI module 41 is for receiving user input. The program 42 is for generating the print data and the customized setting, and for transferring the print data and the customized setting to the printer 11. The UI module 41 is an example of a module. The normal sheet settings need not be pre-stored in the memory of the printer 11. In such a case, the application 37 transmits the print data, and the customized setting or the normal sheet settings to the printer 11.

The UI module 41 has a higher hierarchy than the program 42, and thus the program 42 executes processes according to instructions or commands transmitted from the UI module 41. The instructions or commands are transmitted to the program 42 from the UI module 41 via an Application Programming Interface (API) included in the program 42, for example. The application 37 defines program instructions, and thus the UI module 41 defines a group of program instructions for controlling the CPU 31 to function as a processing module or as one processing unit.

The UI module 41 is designed by the developer of the application 37. The developer of the application 37 designs the UI module 41 according to the type of the OS 36, such as Android (registered trademark) or iOS (registered trademark). Specifically, the UI module 41 is written in a first programming language which is the same langue as the OS 36 so that the UI module 41 can use functions provided by the fourth API 48 of the OS 36. The vendor of the printer 11 provides the program 42 to the developer of the application 37. That is, the program 42 is what is called an SDK (Software Development Kit). The developer of the application 37 develops the application 37 by incorporating the program 42 provided by the vendor of the printer 11 with the designed module 41.

The program 42 has configurations for facilitating development of the UI module 41 by the developer, as described below.

The program 42 includes the main module 43, the common module 44, the library 45, and a Printer Driver folder 54 (ptd folder). In other words, each of the modules 43, 44, 45 is a program unit configuring the program 42. In the program 42, a lower-level module (for example, the library 45) executes processes according to instructions or commands from a higher-level module (for example, the main module 43). The instructions or commands are transmitted from the higher-level module to the lower-level module via an API included in the lower-level module. The program 42 defines program instructions, and thus each module (43, 44, or 45) defines a corresponding group of program instructions for controlling the CPU 31 to function as a processing module or as one processing unit.

The main module 43 has a function to receive information and data from the UI module 41 via the OS 36. Specifically, the main module 43 includes a first API 46, a second API 47, and a third API 48 which are called by the UI module 41 via the OS 36.

The first API 46 (each of a first sheet type API 51 and a second sheet type API 52 descried below) is configured to require input of setting information in a data format different from the binary format. Here, the data format different from the binary format is a text format for example. The setting information indicates a width, a length, and sizes of margins for a sheet that are inputted by the user using the touch panel 22, for example. The UI module 41 transfers the setting information (the width, length, and sizes of margins for the sheet, for example) to the program 42 by inputting as arguments the setting information without modification to the first API 46. That is, the UI module 41 need not convert the setting information into data in the binary format. Accordingly, the UI module 41 and the application 37 can be easily developed.

The first API 46 includes the first sheet type API 51 and the second sheet type API 52. The first sheet type API 51 corresponds to a sheet of the standard size for example. The second sheet type API 52 corresponds to a non-fixed length sheet (or variable-length sheet) whose (remaining) length is changed when used, such as a roll sheet. That is, setting information required as arguments by the first sheet type API 51 is different from setting information required as arguments by the second sheet type API 52. For example, the first sheet type API 51 corresponding to the standard size sheet requires as arguments the width of the sheet, the length of the sheet, the sizes of margins on the sheet in the width direction and in the longitudinal direction, and a pitch (or length) between labels. The second sheet type API 52 corresponding to the non-fixed length sheet requires as arguments the width of the sheet, the length of the sheet, and the sizes of margins on the sheet in the width direction and in the longitudinal direction.

A storing format request API 57 in a dotted rectangle shown in FIG. 1(C) will be explained in a modification described later. The first sheet type API 51 and the second sheet type API 52 are examples of a transmission format request API. The standard size sheet is an example of a first type sheet. The non-fixed length sheet is an example of a second type sheet. The width of the sheet, the length of the sheet, sizes of margins in the width direction and in the longitudinal directions, and the pitch between labels which the first sheet type API 51 requires as arguments are examples of a first specific value. The width of the sheet, the length of the sheet, and sizes of margins in the width direction and in the longitudinal directions which the second sheet type API 52 requires as arguments are examples of a second specific value.

The UI module 41 calls one of the APIs 51 and 52 in the first API 46 corresponding to the type of the sheet designated by the user through the touch panel 22. Specifically, when the user designates a standard size sheet, the UI module 41 calls the first sheet type API 51 and transfers values such as the width of the sheet, the length of the sheet, the sizes of the margins on the sheet in the width direction and in the longitudinal direction, and the pitch (or length) between labels to the main module 43 by inputting these values, as arguments, into the first sheet type API 51. On the other hand, when the user designates a non-fixed length sheet, the UI module 41 calls the second sheet type API 52 and transfers the values such as the width of the sheet, the length of the sheet, the sizes of the margins on the sheet in the width direction and in the longitudinal direction to the main module 43 by inputting these values, as arguments, into the second sheet type API 52.

The main module 43 includes a plurality of APIs (51, 52) corresponding to respective one of the types of sheets, and thus can require information only for corresponding to the type of the sheet from the UI module 41. Specifically, for cases in which the user designates a non-fixed length sheet, the main module 43 does not require a pitch (or length) between labels to the main module 43. Accordingly, the UI module 41 can be more easily designed and the application 37 can be more easily developed compared to a conceivable case where the main module 43 requires all the setting information (setting values for all setting items) from the UI module 41 irrespective of the type of the sheet.

The second API 47 is used when the main module 43 receives a setting file from the UI module 41. The setting file includes a customized setting. The customized setting is in the binary format that the printer 11 can process. An information processing apparatus (a personal computer, for example) other than the information processing apparatus 10 may generate a setting file, and the generated setting file may be inputted into the information processing apparatus 10, for example. In such a case, the UI module 41 transfers the setting file as is to the main module 43 as an argument or transfers a path designating the location of the setting file to the main module 43 as an argument so that the main module 43 can acquire the setting file. Since the main module 43 is provided with not only the first API 46 but also the second API 47, the main module 43 can receive from the UI module 41 setting information for generating a customized setting, and the customized setting itself. The setting file is what is called a BIN file, and an example of a file including a second parameter.

The third API 48 is an API for receiving image data from the UI module 41. The main module 43 receives the image data or a path designating the location of the image data through the third API 48, while the image data or the path is inputted into the third API 48 as an argument.

The library 45 includes a fourth API 53, a table 55, and a database 56. The library 45 and the ptd folder 54 are stored in a same folder, as shown in a dotted rectangle of FIG. 1(C). Alternatively, the ptd folder 54 may be stored in a subfolder of the folder in which the library 45 is stored.

The fourth API 53 is an API called from the main module 43. The library 45 receives information such as the setting information from the main module 43 via the fourth API 53, as described later in detail.

As shown in FIG. 2(A), the ptd folder 54 can store a plurality of ptd files 541. Each ptd file 541 includes function information indicating the functions of one type (model) of printer 11. Specifically, as shown in FIG. 2(B), the function information stored in a ptd file 541 includes numerical values indicating a resolution, and a numerical value specifying the number of pins in the print head of the printer 11. The ptd file 541 is the same as files conventionally implemented in printer drivers.

As shown in FIG. 2(C), the table 55 includes correlations. Here, each correlation is between a model name of the printer 11 and a file path for a ptd file 541 corresponding to the model name. The file path is information indicating the storage location of the ptd file 541 in the ptd folder 54. In this example, the file path is a relative path indicating the location of the ptd file 541 relative to the ptd folder 54. The file path is used to identify the ptd file 541 corresponding to the model name, as will be described later. The model name may be a series name of the printer 11.

The database 56 includes records. Each record correlates a type (or model) of the printer 11 with sheet function information related to a sheet. As shown in FIG. 2(D), the sheet function information includes a sheet type, a maximum sheet width, a minimum sheet width, a maximum sheet length, a minimum sheet length, a maximum margin in the width direction, and a minimum margin in the width direction, for example. The sheet type is either the non-fixed length sheet or the standard-size sheet.

The library 45 generates a customized setting in the binary format, which can be inputted into the printer 11, by using setting information transferred from the main module 43 via the fourth API 53, a model name of the printer 11 transferred from the main module 43 via an API (not shown), a ptd file 541, and the database 56.

The library 45 provides the common module 44 with the function information in the ptd file 541 via the main module 43 so that the common module 44 can refer to the function information when the common module 44 generates the print data. That is, the customized setting to be inputted into the printer 11 is generated using the function information that is referenced when generating the print data.

The common module 44 is a module for generating print data using the image data. The common module 44 includes an API (not shown) for receiving from the main module 43 the image data or a path designating the location of the image data.

The common module 44 further includes an API (not shown) for receiving from the main module 43 the customized setting or a path designating the location of the customized setting. The common module 44 generates transmission data including the customized setting received from the main module 43 and the generated print data, and transfers the transmission data to the main module 43, as described below in later.

Figure 3:
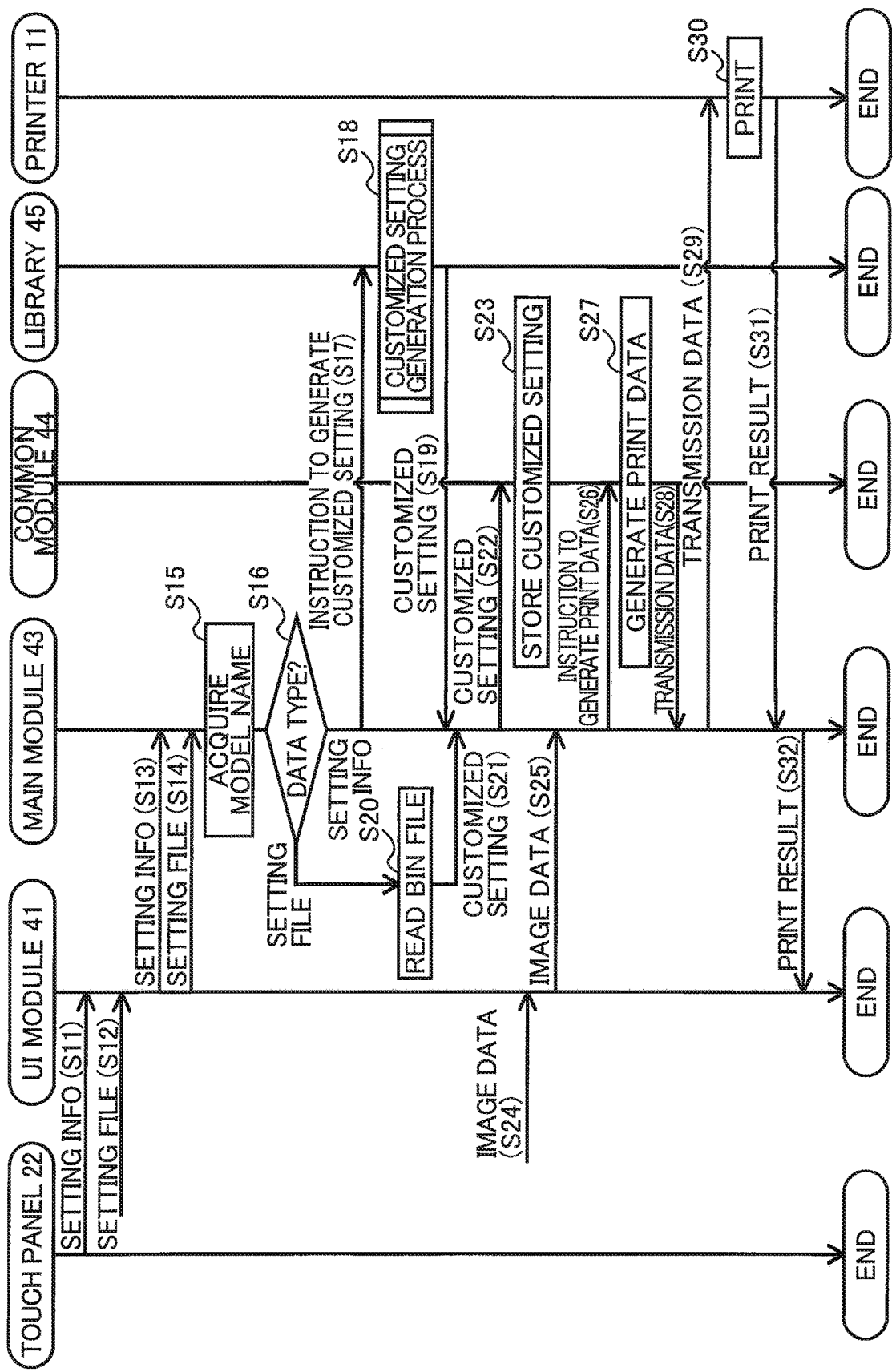
FIG. 3 is a sequence diagram illustrating a process executed by the application.
Figure 4:
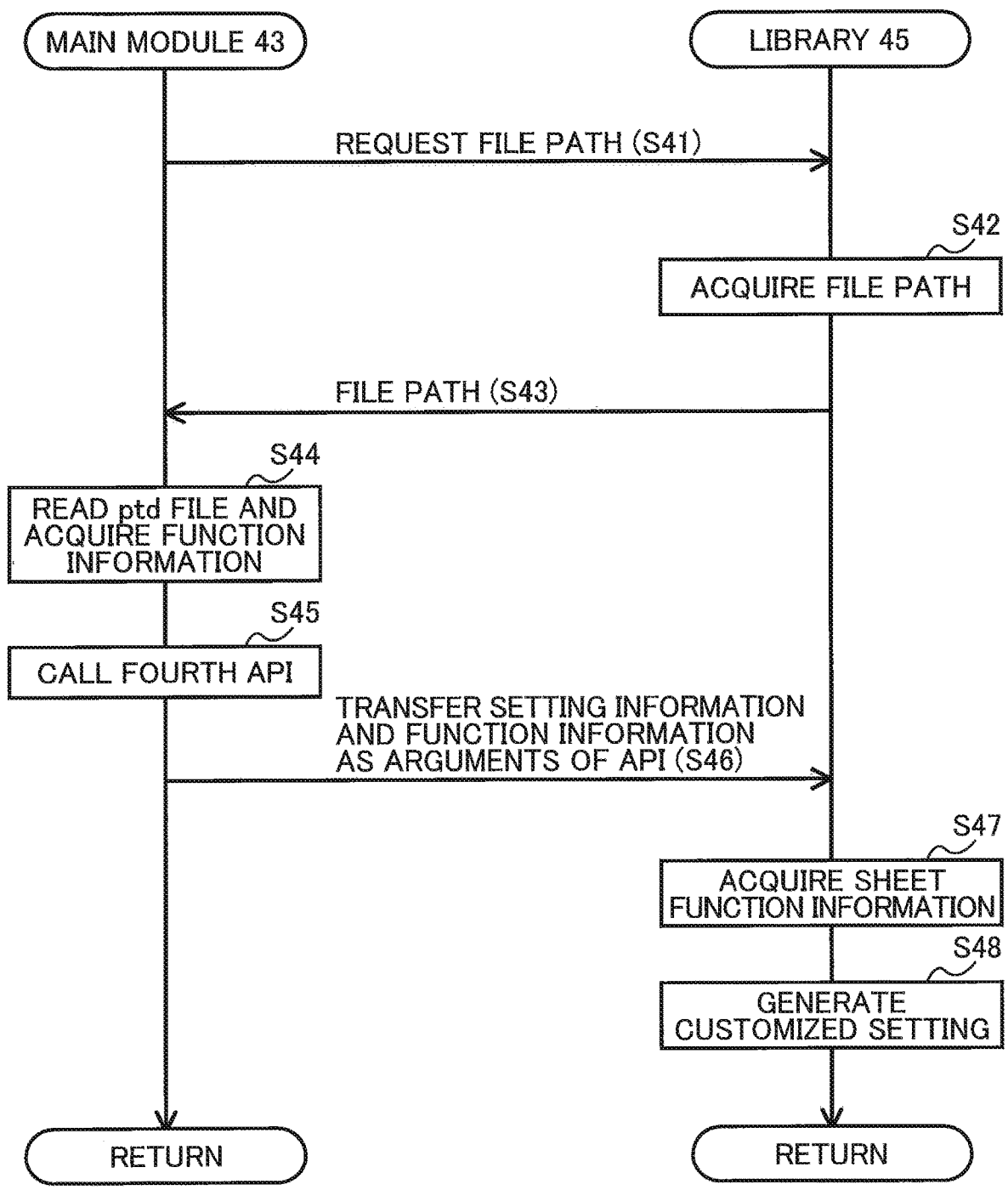
FIG. 4 is a sequence diagram illustrating a process executed between a main module and a library.

Referring to FIGS. 3 and 4, an explanation will be made for processes executed by the CPU 31 according to the UI module 41 of the application 37, and the main module 43, common module 44, and library 45 of the program 42.

A process executed by the CPU 31 according to instructions described in a program may be described using abbreviated expressions, such as "the CPU 31 executes," "the main module 43 executes," "the common module 44 executes," and "the library 45 executes."

The application 37 is started by the OS 36 according to an instruction from another application that generates image data, for example. The user designates the model name of the printer 11 via the touch panel 22, and then the OS 36 starts the application 37 correlated with the designated model name of the printer 11.

The UI module 41 of the started application 37 controls the touch panel 22 to display a screen for receiving inputs by the user. The screen includes a pull-down menu that allows the user to select the sheet type, and text boxes that receive the width and length of the sheet, and the sizes of margins. In S11 of FIG. 3, the user inputs setting information indicating the sheet type, the width and length of the sheet, and the sizes of the margins by using the touch panel 22.

In S11 the UI module 41 receives the setting information in the text format, for example. The setting information in the text format that the UI module 41 receives is an example of a first parameter. The process in S11 is an example of a process for acquiring a parameter.

After receiving the input of the setting information, the UI module 41 calls one of the APIs (51 or 52) in the first API 46 corresponding to the sheet type indicated by the setting information. Specifically, for cases in which the sheet type indicates a standard-size sheet, the UI module 41 calls the first sheet type API 51. For cases in which the sheet type indicates the non-fixed length sheet, the UI module 41 calls the second sheet type API 52. In S13 the UI module 41 transfers the received setting information in the text format to the main module 43 of the program 42 by setting the setting information as arguments of the called API (51 or 52) of the first API 46. In S13 the main module 43 acquires the setting information from the UI module 41. The setting information that the main module 43 acquires in the process in S13 is an example of a specific value. The process in S13 is an example of a process for receiving a specific value.

Alternatively, instead of receiving the setting information through the touch panel 22, in S12 the UI module 41 may receive a setting file inputted from the other information processing apparatus different from the information processing apparatus 10, as described above. After receiving the setting file, the UI module 41 calls the second API 47. In this case, in S14 the UI module 41 transfers the received setting file or a path designating the setting file to the main module 43 by setting the setting file or the path as an argument of the called second API 47. Accordingly, in S14 the main module 43 acquires the setting file from the main module 43 via the second API 47. The process in S14 is an example of a process for receiving a file.

The setting file including the customized setting is an example of a setting instruction file. The processes in S11 and S12 in which the UI module 41 receives selecting to input the setting information and selecting to input the setting file are examples of a process for receiving a user selection. The process in S13 in which the UI module 41 calls the first API 46 in response to receiving input of the setting information is an example of a first calling process. The process in S14 in which the UI module 41 calls the second API 47 in response to receiving input of the setting file is an example of a second calling process.

After receiving the setting information or the setting file, in S15 the main module 43 acquires the model name of the printer 11. For example, the main module 43 acquires from the OS 36 the model name specified by the user when the OS 36 started the application 37. Alternatively, the memory 32 may store the model name in correlation with the main module 43, and the main module 43 may read the model name correlated with the main module 43 itself from the memory 32. Alternatively, the main module 43 may receive the model name together with the setting information from the UI module 41. The process in S15 is an example of a process for acquiring printer type information.

In S16 the main module 43 determines whether the information inputted from the UI module 41 is setting information or a setting file. For cases in which the acquired information is setting information (S16: setting information), in S17 the main module 43 instructs the library 45 to generate a customized setting which is a command in the binary format that can be inputted into the printer 11.

In response to receiving the instruction to generate the customized setting, in S18 the library 45 performs a customized setting generation process shown in FIG. 4.

In the customized setting generation process, the library 45 acquires function information such as the resolution included in the ptd file 541 (FIG. 2(B)), which is stored in the same folder as the library 45, from the main module 43 (S41-S46). The library 45 does not have a function to read a file and acquire information and data from the file. On the other hand, the main module 43 has a function to read a file and acquire information and data from the file. The main module 43 reads the ptd file 541 and transfers the function information included in the ptd file 541 to the library 45.

Specifically, in S41 the main module 43 requests of the library 45 the file path corresponding to the model name acquired in S15. The request is made using an API or a function.

In response to receiving the request, in S42 the library 45 selects and acquires the file path corresponding to the model name in the request from the table 55 (FIG. 2(C)). Subsequently, in S43 the library 45 transfers the file path to the main module 43. Here, the file path is a relative path from the folder 54 to the ptd file 541, and thus does not include a folder path described below.

The main module 43 identifies the ptd file 541 using the file path received from the library 45 and the folder path stored in the memory 32. The folder path is an absolute path indicating the location of the ptd folder 54 from a root folder. Specifically, the main module 43 identifies the ptd folder 54 designated by the folder path and the ptd file 541 designated by the file path in the identified ptd folder 54. In S44 the main module 43 reads the ptd file 541 and acquires the function information from the ptd file 541. Here, the main module 43 acquires the folder path when the application 37 is installed and set up.

In S45 the main module 43 calls the fourth API 53 included in the library 45, and sets the function information included in the ptd file 541 and the setting information acquired in S13 as arguments of the fourth API 53 so as to transfer the function information and the setting information to the library 45 in S46. The data format of the setting information that the main module 43 transfers to the library 45 may be a binary format or other data formats. The data format of the setting information that the main module 43 transfers to the library 45 is determined based on the data format of the argument that the fourth API 53 requires. That is, setting information in a data format that the fourth API 53 does not define (or require) will not be transferred to the library 45.

In S46 the library 45 acquires the function information and the setting information set as the arguments of the fourth API 53 from the main module 43. In S47 the library 45 identifies the sheet function information in the database 56 (FIG. 2(D)) that corresponds to the model name acquired from the main module 43, and acquires the identified sheet function information. In S48 the library 45 converts setting values of the function information, the setting information, and the sheet function information into one or more commands in the binary format and data in the binary format accompanying theses commands to generate the customized setting, and ends the process in S18. As described above, in S44 the main module 43 acquires the function information corresponding to the model name acquired in S15, and in S47 the library 45 acquires the sheet function information corresponding to the model name. Accordingly, the customized setting includes setting values (parameters) related to the sheet for all the setting items that are required for the printer 11 of the model name acquired in S15. More specifically, the library 45 calculates all of the parameters (or setting values) concerning the sheet on the basis of the setting information, the function information, and the sheet function information. For example, the library 45 determines whether each of the width and length of the sheet and the margin sizes in the width direction and in the longitudinal direction in the setting information is within a range defined by a corresponding maximum value and minimum value defined in the sheet function information. When each of the width and length of the sheet and the margin sizes in the width direction and in the longitudinal direction in the setting information is within the corresponding range, the library 45 generates a customized setting that includes the width and length of the sheet and the margin sizes in the width direction and the longitudinal direction specified in the setting information. Further, the library 45 calculates other sheet-related parameters (for example, a heat level of the thermal head) not included in the setting information. The library 45 generates a setting command that instructs the printer 11 to set the calculated parameters, and a header command accompanying the setting command. The setting command and the header command are generated in the binary format. The generated setting command and header command are included in the customized setting. The function information is an example of a printer characteristic value. The process in S46 is an example of a process for acquiring a characteristic value. The parameters (setting values) of the function information, the setting information, and the sheet function information in the binary format included in the customized setting is examples of a second parameter. The process in S38 is an example of a generating process.

As shown in FIG. 3, in S19 the library 45 transfers the generated customized setting to the main module 43. In S19 the main module 43 acquires the customized setting from the library 45.

On the other hand, when in S16 the main module 43 determines that the received data is a setting file (S16: setting file), the main module 43 skips S17 and S19, in S20 reads the acquired setting file in the binary format, and in S21 acquires the customized setting from the setting file.

In S22 the main module 43 transfers the customized setting acquired in S19 or S21 to the common module 44 via an API.

In S23 the common module 44 stores in the memory 32 the customized setting transferred from the main module 43.

In S24 the UI module 41 receives image data from the other application described above. In S25 the UI module 41 transfers the received image data or a path designating the location of the image data to the main module 43 by setting the received image data or the path designating the location of the image data as an argument of the third API 48 included in the main module 43.

In S25 the main module 43 receives the image data from the UI module 41. In S26 the main module 43 transfers the acquired image data to the common module 44 using an API (not shown) included in the common module 44 so as to instruct the common module 44 to generate print data. The process in S25 is an example of a process for acquiring image data.

In S27 the common module 44 generates print data based on the received image data and the function information (the setting values in the function information) included in the customized setting. Further, the common module 44 generates transmission data including the print data and the customized setting stored in S23. The print data and the customized setting included in the transmission data are generated in the binary format. The process in S27 is an example of a process for generating print data.

In S28 the common module 44 transfers the generated transmission data or a path designating the location of the transmission data to the main module 43.

In S28 the main module 43 receives the transmission data from the common module 44. In S29 the main module 43 calls an API (not shown) included in the OS 36 and instructs the OS 36 to transmit through the API the acquired transmission data to the printer 11 so that the transmission data is transmitted to the printer 11 via the OS 36. The process in S29 is an example of a first transmitting process, an example of a second transmitting process, and an example of a print data transmitting process.

In response to receiving the print data and the customized setting from the information processing apparatus 10, in S30 the printer 11 prints an image represented by the print data on the sheet according to the customized setting. In S31 the printer 11 transmits a print result to the main module 43 via the OS 36. The print result indicates completion of the printing. In S32 the main module 43 transmits the print result to the UI module 41.

In response to receiving the print result indicating completion of the printing, the application 37 ends the process.

Effects of Embodiment

As described above, the program 42 is the SDK. The developer of the application 37 develops the application 37 by incorporating the program 42 provided by the vendor of the printer 11 with the designed module 41. The library 45 of the program 42 generates the customized setting using the setting information and the function information. Thus, the developer of the application 37 need not design the UI module 41 so as to transfer to the program 42 the function information that the printer 11 requires for to executing the printing. The developer of the application 37 only need to design the UI module 41 so as to transfer the setting information inputted by the user to the program 42. Accordingly, development of the UI module 41 and the application 37 can be more facilitated than a conceivable case where the UI module 41 is designed so as to transfer the function information to the program 42.

The program 42 generates the customized setting in the binary format, which is a data format that the printer 11 can read, by using the setting information and the function information in a data format that the printer 11 cannot read. Thus, the UI module 41 need not convert the acquired setting information into data in the binary format that the printer 11 can read. Accordingly, development of the program 42 can be more facilitated than a conceivable case where the UI module 41 is required to transmit the setting information in a data format that the printer 11 can read.

The program 42 receives the setting file including the customized setting as an argument of the second API 47 called by the UI module 41. Thus, the UI module 41 can receive the user input and transfer the setting information to the program 42, and also can receive the setting file including the customized setting generated by the other information processing apparatus and transfer the setting file to the program 42. Accordingly, the program 42 can extend a function of the application 37 to output the setting file as well as the setting information.

The program 42 includes the first sheet type API 51 corresponding to the standard size sheet and the second sheet type API 52 corresponding to the non-fixed length sheet. The first sheet type API 51 requires the setting information in accordance with the standard size sheet. The second sheet type API 52 requires the setting information in accordance with the non-fixed length sheet. That is, the program 42 requires only a type of setting information in accordance with the type of the sheet. Accordingly, development of the UI module 41 and the application 37 can be more facilitated than a case where all types of the setting information are required from the UI module 41 irrespective of the type of the sheet.

The program 42 includes the common module 44 for generating the print data, and the library 45 for generating the customized setting. Accordingly, the program 42 can generate both the customized setting and the print data.

The UI module 41 can receive both the setting information and the setting file. Accordingly, the application 37 can have general purpose properties.

[Modification]

In the embodiment described above, the application 37 receives the setting information and outputs the transmission data including the customized setting and the print data. However, in this modification, the application 37 receives the setting information and outputs the setting file including the customized setting as described below.

Specifically, the first API 46, which is called by the UI module 41, includes the storing format request API 57 in addition to the first sheet type API 51 and the second sheet type API 52. In other words, the main module 43 further includes the storing format request API 57.

Similarly to the first sheet type API 51 and the second sheet type API 52, the storing format request API 57 is an API that requires setting information in the text format as an argument. In a case where the UI module 41 calls the storing format request API 57, the setting information is transferred to the main module 43 from the UI module 41 through the storing format request API 57 similarly to S13 in the embodiment. For cases in which the setting information is received by the main module 43 through the storing format request API 57, the main module 43 converts (or processes) the customized setting generated by the library 45 so as to be included in a file. In S22 and S29 the main module 43 outputs the file including data of the customized setting, and in S23 the file including the customized setting is stored in the memory 32, for example. The file including data of the customized setting is an example of a storing format. For cases in which the setting information is received by the main module 43 through the first sheet type API 51 or the second sheet type API 52, the steps S22, S29 and S23 is executed as the embodiment, that is, the customized setting is outputted without included in a file, and the customized setting itself is stored in the memory 32.

[Effect of Modification]

In the modification described above, the application 37 can output the customized setting that can be transmitted to the printer 11, and also can output and store the file including data of the customized setting.

[Other Modifications]

In the embodiment, the UI module 41 transfers the setting information to the main module 43 without change. That is, the data format of the setting information transferred to the main module 43 from the UI module 41 is the same as that of the setting information received by the UI module 41 via the user input. However, the data format of the setting information transferred to the main module 43 from the UI module 41 may be different from that of the setting information received by the UI module 41 via the user input.

In the embodiment described above, the width and length of the sheet and the sizes of margins are explained as examples of setting information. However, the setting information may be information other than the width and length of the sheet and the sizes of margins.

In the embodiment, the customized setting includes values acquired from the setting information, the function information, and the sheet function information. However, the customized setting may include values acquired only from the setting information and the function information, and not from the sheet function information. Alternatively, the customized setting may include values acquired only from the setting information and the sheet function information, and not from the function information. Alternatively, the customized setting may include values acquired from the setting information and values acquired from information other than the function information and the sheet function information.

In the embodiment, the transmission data including the customized setting and the print data is transmitted to the printer 11. However, the customized setting and the print data may be transmitted individually to the printer 11.

In the embodiment, the main module 43 includes the two types of APIs, that is, the first sheet type API 51 and the second sheet type API 52. However, the main module 43 may include number of APIs corresponding to number of sheet types. For example, the main module 43 may further include a third sheet type API and a fourth sheet type API in addition to the APIs 51 and 52.

What is claimed is:

1. A non-transitory computer readable storage medium storing a set of program instructions for an information processing apparatus comprising a computer, a communication interface configured to communicate with a printer, and a user interface configured to receive a user input, the set of program instructions including a set of first program instructions, the first program instructions includes a plurality of first Application Programming Interfaces (API), wherein the set of the first program instructions, when executed by the computer, causes the information processing apparatus to perform:

in response to calling a first API which is included in the first program instructions from an interface module via an operating system (OS), the first API being selected from among the plurality of first APIs based on a designation by the user via the user interface, transferring the called first API to the interface module to enable the interface module to input a specific value as an argument into the received first API and return the specific value which is an argument of the called first API, the interface module acquiring a first parameter via the user interface, the first parameter concerning a sheet on which an image is to be printed by the printer, the specific value depending on the first parameter and being different from print data;

receiving, from the interface module, the specific value through the called first API to which the interface module inputs the specific value as the argument;

acquiring printer type information indicating a type of the printer;

acquiring a printer characteristic value corresponding to the printer type information;

generating second parameters by using the specific value and the printer characteristic value, the second parameters being all of parameters which concern the sheet and correspond to the type of the printer indicated by the printer type information; and outputting the generated second parameters.

2. The non-transitory computer readable storage medium according to claim 1, wherein the second parameters are generated in a data format that the printer is capable of reading by using the specific value that the printer is incapable of reading.

3. The non-transitory computer readable storage medium according to claim 1, wherein the set of first program instructions, when executed by the computer, causes the information processing apparatus to further perform:

in response to calling a second API from the interface module via the OS, transferring the second API to the interface module to enable the interface module to input a file including the second parameters as an argument into the second API;

receiving the file including the second parameters through the second API to which the interface module inputs the file as the argument; and outputting the received second parameters included in the received file.

4. The non-transitory computer readable storage medium according to claim 1, wherein the plurality of first APIs includes a first sheet type API correlated with a first type sheet and a second sheet type API correlated with a second type sheet, wherein the first sheet type API requires as an argument a first specific value corresponding to the first sheet type, wherein the second sheet type API requires as an argument a second specific value corresponding to the second sheet type, wherein the called API is the first sheet type API when the first type sheet is selected in the user interface and the called API is the second sheet type API when the second type sheet is selected in the user interface.

5. The non-transitory computer readable storage medium according to claim 4, wherein the first program instructions further includes a storing format request API and wherein the first sheet type API and the second sheet type API is a transmission format request API, wherein the outputting outputs the second parameter in a transmission format in a case where the specific value is received via the transmission format request API, wherein the outputting outputs the second parameter in a storing format in a case where the specific value is received via the storing format request API.

6. The non-transitory computer readable storage medium according to claim 1, wherein the first parameter includes at least one of a width of a sheet, a length of the sheet, and a size of the margin on the sheet, wherein the specific value is at least one numerical value for the at least one of a width of a sheet, a length of the sheet, and a size of the margin on the sheet.

7. The non-transitory computer readable storage medium according to claim 1, wherein the set of first program instructions, when executed by the computer, causes the information processing apparatus to further perform:

acquiring image data;

generating the print data by converting the image data; and transmitting the generated print data to the printer via the communication interface.

8. The non-transitory computer readable storage medium according to claim 1, wherein the set of program instructions further comprises a set of second program instructions for controlling the computer to function as the interface module.

9. A non-transitory computer readable storage medium storing a set of program instructions for an information processing apparatus comprising a computer, and a communication interface configured to communicate with a printer, the set of program instructions including a set of first program instructions and a set of second program instructions for controlling the computer to function as the interface module, the set of first program instructions, when executed by the computer, causing the information processing apparatus to perform:

in response to calling a first Application Programming Interface (API) from an interface module, transferring the first API to the interface module to enable the interface module to input a specific value as an argument into the received first API, the interface module acquiring a first parameter via the user interface, the first parameter concerning a sheet on which an image is to be printed by the printer, the specific value depending on the first parameter;

receiving the specific value through the first API to which the interface module inputs the specific value as the argument;

acquiring printer type information indicating a type of the printer;

acquiring a printer characteristic value corresponding to the printer type information;

generating second parameters by using the specific value and the printer characteristic value, the second parameters being all of parameters which concern the sheet and correspond to the type of the printer indicated by the printer type information;

outputting the generated second parameters;

in response to calling a second API from the interface module, transferring the second API to the interface module to enable the interface module to input a file including the second parameters as an argument into the second API;

receiving the file including the second parameters through the second API to which the interface module inputs the file as the argument; and outputting the received second parameters included in the received file, wherein the set of second program instructions comprises:
receiving a user selection from one of a first selection for inputting the setting file including the second parameter and a second selection for inputting the first parameter;
in response to receiving the first selection, calling the first API; and
in response to receiving the second selection, calling the second API.

10. An information processing apparatus comprising:
a communication interface configured to communicate with a printer;
a user interface configured to receive a user input; and
a computer configured to execute first program instructions, the first program instructions includes a plurality of first Application Programming Interfaces (API), the computer configured to perform:
in response to calling a first API which is included in the first program instructions from an interface module via an operating system (OS), the first API being selected from among the plurality of first APIs based on a designation by the user via the user interface, transferring the called first API to the interface module to enable the interface module to input a specific value as an argument into the received first API and return the specific value which is an argument of the called first API, the interface module acquiring a first parameter via the user interface, the first parameter concerning a sheet on which an image is to be printed by the printer, the specific value depending on the first parameter and being different from print data;
receiving, from the interface module, the specific value through the called first API to which the interface module inputs the specific value as the argument;
acquiring printer type information indicating a type of the printer;
acquiring a printer characteristic value corresponding to the printer type information;
generating second parameters by using the specific value and the printer characteristic value, the second parameters being all of parameters which concern the sheet and correspond to the type of the printer indicated by the printer type information; and
outputting the generated second parameters.

11. A method for controlling an information processing apparatus including: a communication interface configured to communicate with a printer; a user interface configured to receive a user input; and a computer having first program instructions, the first program instructions including a plurality of first Application Programming Interfaces (API), the method comprising:
in response to calling a first API which is included in the first program instructions from an interface module via an operating system (OS), the first API being selected from among the plurality of first APIs based on a designation by the user via the user interface, transferring the called first API to the interface module to enable the interface module to input a specific value as an argument into the received first API and return the specific value which is an argument of the called first API, the interface module acquiring a first parameter via the user interface, the first parameter concerning a sheet on which an image is to be printed by the printer, the specific value depending on the first parameter and being different from print data;
receiving, from the interface module, the specific value through the called first API to which the interface module inputs the specific value as the argument;
acquiring printer type information indicating a type of the printer;
acquiring a printer characteristic value corresponding to the printer type information;
generating second parameters by using the specific value and the printer characteristic value, the second parameters being all of parameters which concern the sheet and correspond to the type of the printer indicated by the printer type information; and
outputting the generated second parameters.

* * * * *

UNITED STATES PATENT AND TRADEMARK OFFICE
CERTIFICATE OF CORRECTION

| | |
|---|---|
| PATENT NO. | : 11,449,291 B2 |
| APPLICATION NO. | : 16/655327 |
| DATED | : September 20, 2022 |
| INVENTOR(S) | : Naoki Kusumoto |

It is certified that error appears in the above-identified patent and that said Letters Patent is hereby corrected as shown below:

On the Title Page

(71) Applicant should read:
Brother Kogyo Kabushiki Kaisha
Nagoya, Aichi (JP)

(73) Assignee should read:
Brother Kogyo Kabushiki Kaisha
Nagoya, Aichi (JP)

Signed and Sealed this
Fourteenth Day of March, 2023

*Katherine Kelly Vidal*

Katherine Kelly Vidal
*Director of the United States Patent and Trademark Office*